United States Patent [19]

Clough et al.

[11] Patent Number: 5,068,160

[45] Date of Patent: Nov. 26, 1991

[54] BIPOLAR PLATE BATTERY

[75] Inventors: Thomas J. Clough, Santa Monica; Richard J. Moulton, Lafayette, both of Calif.

[73] Assignee: Ensci, Inc., Santa Monica, Calif.

[21] Appl. No.: 510,452

[22] Filed: Apr. 17, 1990

[51] Int. Cl.$^5$ .......................................... H01M 10/18
[52] U.S. Cl. .................................. 429/72; 429/210; 429/154
[58] Field of Search ................ 429/210, 153, 154, 155, 429/72

[56] References Cited

U.S. PATENT DOCUMENTS

| | | | |
|---|---|---|---|
| 3,728,158 | 4/1973 | Poe et al. | 429/210 |
| 4,098,967 | 7/1978 | Biddick et al. | 429/210 |
| 4,644,053 | 2/1987 | Brunelle et al. | 528/371 |
| 4,708,918 | 11/1987 | Fitzgerald et al. | 429/210 |
| 4,861,689 | 8/1989 | Clough et al. | 429/210 |
| 4,900,643 | 2/1990 | Eskra et al. | 429/210 |

FOREIGN PATENT DOCUMENTS 0251683 1/1988 European Pat. Off. .

OTHER PUBLICATIONS

Tomkinson-Walles, Gayle, Stampable RTP Sheet, GE Plastics, 1 Plastics Ave., Pittsfield, MA, 01201.
Wood, A. Stuart, Tough New Materials, More Automation Give A Lift to Thermoplastic Composite Sheet, Modern Plastics, 2/90, 38–41.
Stitt, Alex, The Pulsar Battery, The Battery Man, 9/86.
Mengel, G. R., Resins and Compounds, Modern Plastics Mid-October Encyclopedia Issue.
Hardman, A. M., A Comparison of Flooded, Celled and Absorptive Separator Lead/Acid Cells, Journal of Power Sources, 23 (1988), 127–134.
Wandzy et al., Separators For Absorbed Electrolyte Recombinant Batteries, The Battery Man, Jul. 1986.
'Cyclics' Technology May Make TP Composites Common, Modern Plastics, Nov. 1989.
Brunelle et al., Preparation & Polymerization of Cyclic Oligomeric Carbonates: New Route to Super-High Molecular Weight Polycarbonate: An Overview, GE Corporate Research and Development.
Boden et al., Efficient Preparation of Cyclic Oligomeric Bisphenol A Carbonates: Mechanism for Selective Formation of Cyclic Oligomers, GE Corporate Research and Development.
Evans et al., Fundamentals of Cyclic EPA Carbonate Oligomer Ring–Opening Polymerization, GE Corporate Research and Development.
Stewart, Kevin Randall, Melt Polymerization of EPA Cyclic Polycarbonate Oligomers: Rheokinetics of Polymerization Relevant to Reactive Processing, GE Corporate Research and Development.
Rosenquist et al., Formation of Crosslinked Networks Via Polymerization of Oligomeric Cyclic Carbonates in the Presence of Polyfunctional Co–Reactants, GE Plastics, Mt. Vernon Tech. Dept.
Guggenheim et al., Synthesis & Polymerization of Cyclic Oligomeric Arylates Based on Bisphenol A and Isophthaloyl Dichloride, GE Corporate Research and Development.
Cella et al., The Preparation of Novel Cyclic Oligomers, GE Corporate Research and Development.
Salem et al., Fabrication of Thermoplastic Matrix Structural Composites By Resin Transfer Molding of BPA Polycarbonate, GE Corporate Research and Development.
Physical & Mechanical Properties of Polymerized BPA-PC Cyclic (Neat Resin), Data Sheet, GE Pittsfield Technology Department.
The Pulsar Power Pack Information Sheet.
SD-9101 (Polycarbonate Alloy) Preliminary Data Sheet, Polysar Inc., Leominster, MA.
The Ultrasonic Process information sheet.

*Primary Examiner*—Donald L. Walton
*Attorney, Agent, or Firm*—Frank J. Uxa, Jr.

[57] ABSTRACT

An assembled battery including a plurality of bipolar cells is disclosed. In one embodiment, the battery comprises a plurality of conduits for introducing electrolyte into the bipolar cells, each of the conduits acting to introduce electrolyte into a different one of the bipolar cells. In another embodiment, the battery comprises at least one spacer element acting to maintain the spacing between plates and/or electrodes in the battery.

29 Claims, 5 Drawing Sheets

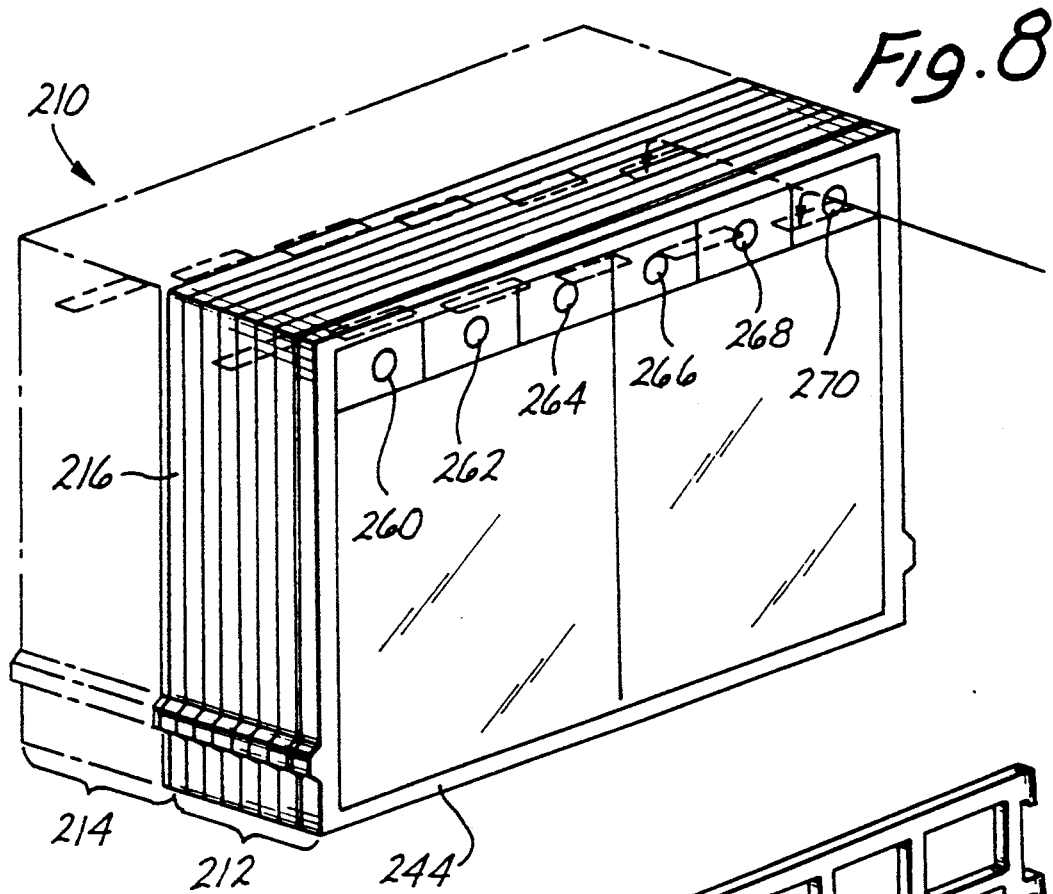
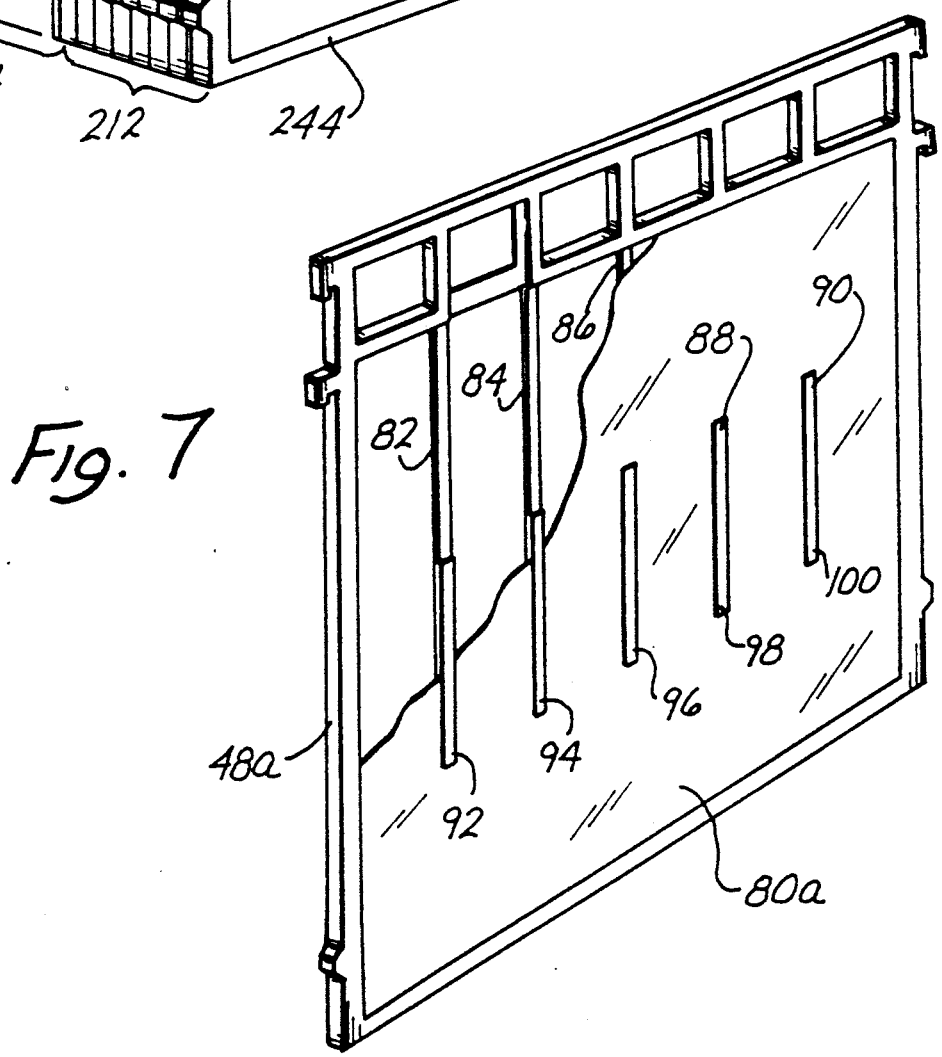

BIPOLAR PLATE BATTERY

TECHNICAL FIELD

The present invention relates to lead-acid batteries. More particularly, the invention relates to lead-acid batteries, in particular bipolar plate lead-acid batteries which provide substantial advantages, e.g., are structured to be effectively filled with controlled amounts of electrolyte and/or effectively limit, preferably substantially prevent, the liquid and/or gaseous components from one bipolar cell from interfering with the functioning of another bipolar cell and/or to maintain the desired spacing between electrodes.

BACKGROUND ART

Even though there has been considerable study of alternative electrochemical systems, the lead-acid battery is still the battery of choice for general purposes, such as starting a vehicle, boat or airplane engine, emergency lighting, electric vehicle motive power, energy buffer storage for solar-electric energy, and field hardware, both industrial and military. These batteries may be periodically charged from a generator.

The conventional lead-acid battery is a multi-cell structure. Each cell generally comprises a set of vertical positive and negative plates formed of lead or lead alloy grids containing layers of electrochemically active pastes. The paste on the positive plate when charged comprises lead dioxide, which is the positive active material, and the negative plate contains a negative active material such as sponge lead. An acid electrolyte, based on sulfuric acid, is interposed between the positive and negative plates.

Lead-acid batteries are inherently heavy due to use of the heavy metal lead in constructing the plates. Modern attempts to produce light-weight lead-acid batteries, especially in the aircraft, electric car and vehicle fields, have placed their emphasis on producing thinner plates from lighter weight materials used in place of and in combination with lead. The thinner plates allow the use of more plates for a given volume, thus increasing the power density.

Higher voltages are provided in a bipolar battery including bipolar plates capable of through-plate conduction to serially connected electrodes or cells. The bipolar plates must be impervious to electrolyte and be electrically conductive to provide a serial connection between electrodes.

U.S. Pat. Nos. 4,708,918 and 4,861,689 discuss various aspects of bipolar plates and batteries.

One problem which has presented itself in considering bipolar plate batteries or bipolar batteries is the addition of electrolyte to the assembled battery. Such a bipolar battery includes a plurality of bipolar cells, each of which include a negative electrode, a positive electrode, a separator between the electrodes to separate the electrode and hold electrolyte, and a fluid impervious, electrically conductive bipolar plate adjacent each electrode. Thus, each bipolar plate may be considered to be a part of two bipolar cells. The thickness of such bipolar cells is often significantly less than the thickness of conventional monopolar cells, such as in the range of about 0.080 inches to about 0.300 inches per cell. Such reduced thickness makes filling each of the bipolar cells, which are to be isolated against fluid flow one from the other, with a controlled amount of electrolyte quite difficult, particularly at fill rates to satisfy commercial production schedules and/or using commercially available equipment. A second problem presented is to effectively limit the liquid and/or gaseous components from one bipolar cell from interfering with the functioning of another bipolar cell. Such cell to cell interference can result in a reduction in the overall efficiency of the bipolar battery, or even in battery failure.

Another problem with bipolar batteries is that of maintaining the spacing between positive and negative electrodes. Maintaining the interelectrode spacing provides substantial performance advantages. For example, substantially uniform spacing between the positive and negative electrodes provides for a substantially uniform current distribution and flow between the bipolar cells and electrode pairs which are included in the assembled bipolar battery. Such spacing is particularly important in sealed maintenance free oxygen recombinant batteries. However, as the dimensions of the bipolar plate surfaces associated with the positive and negative electrodes increase, particularly the surface area dimension, the more difficult it becomes to maintain proper interelectrode spacing. It is often useful to make such surfaces relatively large in order to provide a bipolar battery with the desired capacity.

The present invention addresses these and other problems and concerns as will become apparent hereinafter.

SUMMARY OF THE INVENTION

New batteries and battery elements, in particular lead-acid batteries and battery elements, have been discovered. The present batteries include a plurality of bipolar cells, each of which preferably includes a negative electrode; a positive electrode; a separator means between the electrodes to separate the electrodes, and hold an amount of electrolyte; and a fluid impervious, electrically conductive matrix, e.g., bipolar plate, adjacent each electrode. Such lead-acid batteries can be structured to operate as flooded batteries or as oxygen recombinant batteries.

The present invention provides substantial advantages. For example, the present batteries can be effectively and rapidly provided with a controlled amount of electrolyte, e.g., sulfuric acid, despite the quite limited dimensions of the bipolar cells of the batteries. This electrolyte filling operation is preferably accomplished utilizing commercially available equipment. The present invention also provides for maintaining the spacing, preferably the substantially uniform spacing, between the positive and negative electrodes of the bipolar batteries. Maintaining such spacing is important for maintaining a substantially uniform current distribution and flow between the bipolar cells and the electrode pairs, e.g., the positive and negative electrode on either side of each bipolar plate of the assembled batteries. In addition, the present invention can effectively limit, preferably substantially prevent, the liquid and/or gaseous components from one bipolar cell from interfering with the functioning of another bipolar cell. The present battery elements are relatively easy to manufacture and provide for substantial battery performance benefits.

In one broad aspect of the present invention, an assembled bipolar battery comprises a plurality of means for introducing electrolyte, e.g., sulfuric acid, into the plurality of bipolar cells of the battery. Each of these means acts to introduce electrolyte into a different one of the bipolar cells. Preferably, each of these means includes a conduit, more preferably a different conduit, which is in fluid communication with the one of the bipolar cells into which the means acts to introduce electrolyte. In one embodiment, these conduits are formed as part of the frame of the battery. Since each bipolar cell preferably has its own individual filling conduit, the amount of acid introduced into each individual cell can be very precisely controlled. Each cell is provided with the desired amount, preferably the same amount, of electrolyte. Also, the chances of electrolyte and/or evolved gases and/or entrained acid mists moving from one cell to another cell during use of the battery are substantially reduced or eliminated. If electrolyte or gases do flow between bipolar cells, current losses or even cell failure can result.

In another broad aspect of the invention, a bipolar battery is provided with at least one spacer element, preferably at least one spacer element for each bipolar cell. Each of the spacer elements is associated or in contact with, preferably secured to, a plate, e.g., a bipolar plate, and is located at least partially away from the periphery of the plate. The spacer element acts to maintain the spacing between bipolar cells and/or between electrodes, and/or between the associated plate and an adjacent plate. The spacer element may be considered to be also associated with the adjacent plate. Such a spacer element, which preferably contacts, and more preferably is secured to, the adjacent bipolar plate, provides a structure in which the distance or separation between adjacent plates, e.g., bipolar plates, and between adjacent electrodes is substantially maintained, preferably so that the closest distance between any point on a plate or an electrode and the adjacent plate or electrode, respectively, is substantially uniform. Using such spacer elements, the thickness of each bipolar cell of the battery is preferably maintained substantially uniform. More preferably, the thicknesses of all the bipolar cells are maintained substantially uniform and are substantially equal. Preferably, at least a portion of the spacer element is non-electrically conductive so that no current flows from plate to plate through the spacer element or elements. The use of the spacer element in combination with the bipolar plate allows the use of relatively thin bipolar plates, such as in the range of about 0.015 inches to about 0.040 inches, which feature is particularly important for achieving low internal resistance batteries. In addition, the spacer elements allow each cell to withstand differential pressure transients which the bipolar battery can reach during battery operation, particularly charging.

In a further broad aspect of the invention a battery element useful as at least a positive plate in a lead-acid battery is provided. This element comprises a fluid impervious matrix having mutually opposing first and second surfaces; an acid resistant substrate at least partially coated with an electrically conductive coating, the substrate being at least partially embedded in the matrix; and a positive active electrode material associated with the first surface. In one embodiment, the matrix includes a thermoplastic polymeric material derived from cyclic oligomers. In another embodiment, the matrix includes a polymeric material selected from polycarbonates, polyacrylates and mixtures thereof. Such battery elements are relatively easy to produce, e.g., using conventional thermoplastic polymer forming techniques, and have very advantageous structural and/or performance characteristics.

The several embodiments of the present invention may be employed alone or together, as desired. For example, an assembled battery may include a plurality of means to introduce electrolyte into individual bipolar cells, means to limit gaseous and liquid components from one cell from interfering with the functioning of another cell, a plurality of spacer elements, as defined herein, and battery elements, as described herein. The spacer elements are preferably configured, particularly when the present means for introducing electrolyte are employed, so that electrolyte can flow substantially freely around such elements so that the entire bipolar cell is provided with electrolyte, as desired. In other words, the spacer elements preferably are configured so as to not substantially restrict the flow of electrolyte into or across the bipolar cell and/or restrict the removal of air during filling with electrolyte, and/or deleteriously produce pockets of gas during battery charging and operation.

One important feature of the present invention is the provision of a plurality of electrolyte addition means. Each of such means preferably acts to introduce electrolyte, e.g., sulfuric acid, into a different one of the bipolar cells of the assembled bipolar battery. For example, a 12 volt bipolar battery including six (6) two (2) volt bipolar cells includes six (6) electrolyte addition means.

In one particularly useful embodiment, each electrolyte addition means includes a conduit which is in fluid communication with one, and preferably only one, of the bipolar cells into which such means acts to introduce electrolyte. Preferably, the battery includes an end plate having a plurality of apertures each of which is a portion of a different one of the conduits. These apertures are initially open and are used to introduce electrolyte into the conduits, and ultimately through the conduits into the bipolar cells. The apertures are preferably also used to evacuate the cells prior to introducing electrolyte therein. This cycle of evacuation-electrolyte addition may be repeated more than one time, e.g., two (2) to four (4) and preferably two (2) or three (3) times, in order to get the proper amount of electrolyte into the cell. The use of vacuum facilitates a more uniform distribution of electrolyte in the cell and the wetting out of both the positive and negative active electrode materials, e.g., the pores of such materials, as well as the separator means. The cell is often considered filled with electrolyte even though only a fraction, preferably about 70% to about 95%, of the available void volume of the separator means and the active electrode materials are filled with electrolyte. Once electrolyte addition has been accomplished, the apertures are sealed, preferably individually sealed. In this sealed condition, each of the conduits within the battery acts as a fluid pressure/equalization compartment or reservoir, e.g., for oxygen in a recombinant battery, for the individual cell with which it is in fluid communication. This advantageously provides a degree of flexibility in the operation of the individual bipolar cell, for example, by providing a fluid pressure buffer compartment.

As a further embodiment, one or more, preferably all, of the apertures may be associated with individual venting means, such as pressure relief valves or porous membranes, so that the individual bipolar cells can be protected against excessive pressure conditions. This feature reduces the chances of battery damage caused by localized pressure conditions within the battery.

The opening into the individual cell from the conduit may be oriented in any suitable manner with respect to the general direction of flow in the conduit. For example, this opening may be parallel to the general direction of flow in the conduit. However, it is preferred that the opening into the cell be substantially perpendicular to the general direction of flow in the conduit. Such orientation provides for effective removal through the conduit of the vapor being replaced or displaced by the liquid electrolyte and, overall, provides for effective and efficient electrolyte addition. In one embodiment, a flow guide, or splash director, is provided, e.g., in the conduit, to direct the electrolyte from the conduit into the cell.

In an additional embodiment, an assembled battery is provided which includes a plurality of bipolar cells present in a plurality of groups, e.g., a first group and a second group. An intermediate plate separates each group of bipolar cells from the adjacent group of bipolar cells, and includes a plurality of apertures each of which is in fluid communication with a conduit in fluid communication with one bipolar cell in each of the groups. Each group of bipolar cells may be considered an independent battery, e.g., may be used in a different application, and/or externally parallel or series connected to increase the capacity and/or voltage, respectively, and the individual conduits through each group of bipolar cells in fluid communication may together be considered a combined conduit. Thus, each of the combined conduits, together with an aperture in the end plate, as discussed above, can be used to provide electrolyte to one bipolar cell in each group of bipolar cells.

In another important feature of the present invention, an assembled battery is provided with a plurality of spacer elements. Each bipolar cell is preferably provided with at least one of these spacer elements. Relatively large cells may advantageously employ a plurality of such spacer elements, e.g., up to about 10 and preferably up to about 6 spacer elements, to maintain plate/plate and/or electrode/electrode spacing.

Such spacer elements are preferably at least partially non-electrically conductive and fluid impervious. Such spacer elements preferably have a maximum thickness substantially equal to the thickness of the bipolar cell, e.g., from one surface of one plate to the facing surface of the adjacent plate. In a particularly useful embodiment, the spacer elements are configured so as to allow substantially free or unrestricted flow of electrolyte into substantially all parts of the cell space, i.e., the positive and negative active material and the separator means, and/or to not substantially restrict the removal of air during filling with electrolyte and/or to not deleteriously produce pockets of gas during battery charging and operation.

The spacer element or elements can have a vertical or diagonal orientation or can form a pattern such as a diamond like pattern which has open segments in the pattern to allow electrolyte flow into the pattern. With the use of such a pattern, it provides both a interplate spacer for control of interelectrode spacing, as well as, a grid type pattern which enhances bonding of the active materials to the plate surfaces. In one particularly useful embodiment, a majority of the grid type pattern is at a height above the surface of the bipolar plate equal to about 30% to about 110% of the respective electrode material attached to the bipolar plate surface, whereas a minor portion of such grid type pattern forms the interplate spacer.

The spacer element or elements are in contact with, and preferably secured to, at least one plate, and more preferably in contact with, and still more preferably secured to, both plates making up a bipolar cell. Such securement can involve mechanical interlocking, or physical or chemical bonding. For example, the spacer element or elements can be molded as part of a frame element of the battery or plate and be welded to the plate or plates, preferably to a plate having another spacer element or elements directionally aligned with such spacer element or elements, e.g., using ultrasonic or vibrational welding.

The present assembled battery includes a plurality of bipolar plates. Each of these plates includes a matrix or matrix layer having a first surface and a substantially opposing second surface. This matrix is fluid impervious. For example, electrolyte is not able to pass through the intact matrix. In addition, the bipolar plate includes an acid resistant substrate at least partially coated with an electrically conductive coating such that at least a portion of the coated substrate is embedded in the matrix or matrix layer to form a fluid impervious, electrically conductive composite. The positive active electrode material is associated with, e.g., in electrical communication with, preferably in contact with, the first surface of matrix, and is preferably situated such that at least a portion of the coated substrate contacts the electrode material. This battery element further comprises negative active electrode material associated with, e.g., in electrical communication with, preferably in contact with, the second surface of the matrix.

Any suitable, preferably polymeric, matrix material having the stability at conditions present in a lead-acid battery may be used in the present matrix or matrix layer. The matrix material should be at least initially fluid impervious to be useful in the present battery elements and batteries. Preferably the matrix material comprises one or more synthetic polymers. In one embodiment, the matrix or matrix layer preferably comprises polymer having increased polarity relative to polypropylene.

The polymeric matrix material is more preferably selected from thermoplastic polymeric materials and mixtures thereof. Thermoplastic materials are those which can be softened with heat and while soft can be molded, cast, or extruded under pressure. Among the polymers particularly useful in the present invention are polymers derived from a monomer component comprising a major amount of weight of at least one substantially hydrocarbonaceous compound, more preferably selected from the group consisting of aromatic components, olefins and diolefins (both aliphatic and aromatic) having 2 to about 12 carbon atoms per molecule and a minor amount by weight of at least one additional monomer or polar substituent on such substantially hydrocarbonaceous compound effective to increase the polarity of the polymer. When the polymeric matrix material is a thermoplastic polymer, it is preferred that the matrix be substantially hydrocarbon-based and include one or more groups effective to increase the polarity of the polymer relative to polypropylene. Additive or additional monomers, such as maleic anhydride, vinyl acetate, acrylic acid, methacrylic acid, and the like and mixtures thereof, may be included prior to polymerization to give the substantially hydrocarbon-based polymer increased polarity. Hydroxyl groups may also be included in a limited amount, using conventional techniques, to increase the polarity of the final substantially hydrocarbon-based polymer.

By "substantially hydrocarbonaceous" and "substantially hydrocarbon-based" is meant those compounds and polymers, respectively, which comprise mainly carbon and hydrogen atoms. These compounds and polymers may include minor amounts of one or more non-hydrocarbon groups, e.g., to provide the presently preferred increased polarity, provided that such non-hydrocarbon groups do not substantially interfere with the functioning of the present battery elements and batteries. Among the non-hydrocarbon groups which may be included are those groups which contain halogens, sulfur, nitrogen, oxygen, phosphorous and the like.

Among the preferred thermoplastic polymer matrix materials include co-polymers of additional monomers and olefins such as ethylene, propylene, butylenes, pentenes, hexenes, styrene and mixtures thereof. Other preferred thermoplastic polymers include polyvinylidene difluoride, combinations of polyphenylene oxide and polystyrene, polycarbonates, polyacrylates, polymethacrylates and mixtures thereof.

Because of weight and strength considertions, when the polymeric matrix material is a thermoplastic polymer, it is preferred that the matrix be a polymer based on polypropylene which includes one or more groups effective to increase the polarity, polycarbonates, polyacrylates, polymethacrylates and mixtures thereof. The preferred additional monomer to provide increased polarity is maleic anhydride, more preferably present in the polymer in an amount in the range of about 0.1% to about 10% by weight, more preferably about 1% to about 5% by weight.

A particularly useful class of polymeric materials as matrix materials are those polymeric materials derived from cyclic oligomers. The use of such cyclic oligomer derived polymeric materials provides substantial and important advantages. For example, cyclic oligomers have relatively low viscosity so that fabricating, e.g., by molding, extrusion and the like, structures, particularly complex structures, from such materials is facilitated. In addition, such cyclic oligomers have substantial ability to penetrate the void space often present in the coated substrate and/or to wet or otherwise adhere to the surface of the coated substrate so that the resulting matrix-coated substrate composite is strong and durable and has good electrical properties.

Cyclic oligomers are preferably used to produce polymeric matrix materials selected from the group consisting of polycarbonates, e.g., aliphatic polycarbonates and aromatic polycarbonates; polyacrylates (meaning to include polymethacrylates therein); polyesters, e.g., aliphatic polyesters and aromatic polyesters; polymers prepared from bis-cyclic oligomers, such as those prepared from polyfunctional phenols; polymers prepared from cyclic oligomeric arylates (meaning to include cyclic imidedisiloxane oligomers therein); polymers prepared from cyclic aromatic etherketone oligomers; polymers prepared from cyclic aromatic ethersulfone oligomers; polymers prepared from cyclic aromatic etherimide oligomers and mixtures thereof. The useful cyclic oligomers can include one or more pendant groups, such as alkyl groups and ester groups, particularly such groups which have relatively low molecular weight. More preferably, the cyclic oligomers are used to prepare polycarbonates, in particular aromatic polycarbonates; polyacrylates (meaning to include polymethacrylates therein) and mixtures thereof, still more preferably polycarbonates and mixtures thereof. An especially useful group of cyclic oligomers are cyclic bisphenol A polycarbonate oligomers and mixtures thereof, particularly such oligomers having a degree of polymerization in the range of about 2 to about 30, preferably about 2 to about 12.

Polymeric materials derived from cyclic oligomers are well known in the polymerization art. The preparation of low molecular weight cyclic oligomers and their conversion to high molecular weight polymeric materials is well known. For example, the cyclic oligomers together with a conventional polycarbonate formation catalyst can be simultaneously polymerized and molded upon application of heat, e.g., to a temperature in the range of up to about 350° C., to the mold. A particularly useful method of producing cyclic carbonate oligomers and converting such oligomers to polycarbonates is disclosed in Brunella et al U.S. Pat. No. 4,644,053, the entire disclosure of which patent is hereby expressly incorporated by reference herein.

The substrate is preferably acid resistant. That is, the substrate preferably exhibits resistance to corrosion, erosion and/or other forms of deterioration at the conditions present, e.g., at or near the positive plate, or positive side of the bipolar plates, in a lead-acid battery. Although the coating often provides a degree of protection for the substrate against these conditions, the substrate itself preferably has an inherent degree of acid resistance. If the substrate is acid resistant, the physical integrity and electrical effectiveness of the coating and of the whole present battery element, is better maintained with time relative to a substrate having reduced acid resistance. If glass is used as the substrate, it is preferred that the glass have an increased acid resistance relative to E-glass. Preferably, the acid resistant glass substrate is at least as resistant as is C-glass to the conditions present in a lead-acid battery.

Typical compositions of E-glass and C-glass are as follows:

|  | Weight Percent | |
| --- | --- | --- |
|  | E-glass | C-glass |
| Silica | 54 | 65 |
| Alumina | 14 | 4 |
| Calcia | 18 | 14 |
| Magnesia | 5 | 3 |
| Soda + Potassium Oxide | 0.5 | 9 |
| Boria | 8 | 5 |
| Titania + Iron Oxide | 0.5 | — |

Preferably the glass contains more than about 60% by weight of silica and less than about 35% by weight of alumina, and alkali and alkaline earth metal oxides.

The acid resistant substrate is preferably in the form of particles, flakes or fibers. The substrate may be organic or inorganic. For example, the substrate may comprise an organic-based polymer material, a ceramic, a glass or like material. Because of availability, cost and performance considerations, it is preferred that the substrate be in the form of fibers. The presently useful fibers preferably are in a form selected from the group consisting of fiber rovings, chopped fibers, single fibers, woven and/or non-woven fibers and the like. In order to provide improved point-to-point contacting in the fibrous substrate, which is highly desirable for improved conductivity and electrical effectiveness of the lead-acid battery, the substrate more preferably is in the form of a body of woven and/or non-woven fibers, still more preferably, having a porosity in the range of about 60% to about 95%. Porosity is defined as the percent or fraction or void space within a body of woven fibers. The above-noted porosities are calculated based on the woven and/or non-woven fibers including the conductive coating.

The substrate, because of availability, cost and performance considerations, preferably comprises acid resistant glass, more preferably in the form of glass fibers.

The coating on the substrate is to be electrically conductive. Among the coatings which may be used are metal oxides, preferably metal oxides which are doped with one or more ions to provide for increased electrical conductivity. One particularly preferred metal oxide coating is tin oxide (stannic oxide) which is itself stable at the conditions present in a lead-acid battery.

Any suitable dopant may be used to dope the metal oxide, preferably tin oxide, coating. Such dopant or combination of dopants should be such as to be effective to improve the electric conductivity (reduce the resistivity) of the coating on the substrate. The preferred dopant for the coating is selected from the group consisting of fluoride ion, antimony ion and mixtures thereof. Fluoride ion is particularly preferred since it is especially tolerant of the aggressive environment in a lead-acid battery. The amount of dopant present in the coating may vary widely, provided that the amount present is effective to improve the electrical conductivity of the coating with no dopant present. If fluoride ion is to be used as a dopant, it is preferred that the fluoride ion be present in the coating, e.g., tin oxide coating, in an amount in the range of about 0.01 mole % to about 20 mole %, based on the entire doped tin oxide coating.

The coating on the acid resistant substrate is typically such that satisfactory electrical conductivity is achieved. As noted previously, this coating may also act to physically protect the substrate from the battery environment. The thickness of the coating may vary widely and depends, for example, on the electric conductivity desired, on the coating material being used, and on the type and amount of substrate. The thickness of the coating may be as little as a molecular monolayer. Preferably, the coating has an average thickness in the range of about 0.01 micron to about 10 microns, preferably about 0.1 micron to about 1 micron, particularly when the substrate is in the form of glass fibers having an average diameter in the range of about 1 micron to about 20 microns or higher such as up to about 40 microns and the average length to diameter ratio of the glass fibers is in the range of about 100,000 to about 2,000,000.

Any suitable process may be employed to apply the coating, e.g., doped tin oxide coating, onto the substrate. The primary criterion for such processing is that an effective coating results. Where, as is preferred, the acid resistant substrate is in the form of particles or fibers, the preferred doped tin oxide coating is preferably applied using a new process employing stannous chloride and stannous fluoride discussed in commonly assigned U.S. patent application Ser. No. 272,517, filed Nov. 11, 1988 now abandoned. The coating may also be applied using sol-gel techniques.

The bonding between the matrix material and the coated, acid resistant substrate is important to provide effective battery operation. In order to provide for improved bonding of the coating e.g., a doped tin oxide coating, (on the substrate) with the matrix material, it is preferred to at least partially, more preferably substantially totally, coat the coated substrate with a coupling agent which acts to improve the bonding of the electrically conductive coating with the matrix. This is particularly useful when the substrate comprises acid resistant glass fibers and the electrically conductive coating is doped tin oxide. Any suitable coupling agent may be employed. Such agents preferably comprise a polar portion and a non-polar portion. Certain materials generally in use as sizing for glass fibers may be used here as a "size" for the coated glass fibers. The amount of coupling agent used to coat the coated glass fibers should be effective to provide the improved bonding noted above and, preferably, is substantially the same as is used to size bare glass fibers. Preferably, the coupling agent is selected from the group consisting of silanes, silane derivatives, stannates, stannate derivatives, titanates, titanate derivatives and mixtures thereof. U.S. Pat. No. 4,154,638 discloses silane-based coupling agents adapted for use with tin oxide surfaces. The entire disclosure of this patent is hereby expressly incorporated by reference herein.

Various techniques, such as casting, injection molding, compression molding and the like, may be used to at least partially embed the coated substrate into the matrix material and form the present matrix or matrix layer. The technique employed may be conventional and well known in the art of forming articles from polymeric materials. The choice of technique may depend, for example, on the type of matrix material used, the type and form of the substrate used and the specific application involved. The forming techniques employed may advantageously involve the application of pressure and/or heat, e.g., to produce composites having reduced void space, and therefore enhanced electrical properties. One particular embodiment involves pre-impregnating (or combining) that portion of the coated substrate to be embedded in the matrix material with a relatively polar (increased polarity relative to polypropylene) thermoplastic polymer, such as polyvinylidene difluoride, polycarbonate or polyacrylate prior to the coated substrate being embedded in another bondable thermoplastic matrix material, such as a polyolefin, for example including polypropylene, modified polypropylene and the like. Such pre-impregnation provides enhanced bonding between the coated substrate and the bondable matrix material.

The assembled battery of the present invention preferably includes a frame and end plates which together form the housing for the battery. Although the frame and end plates can be made of any suitable material, such components, and in particular the frame, are preferably made of a material, more preferably a polymeric material which is bondable to the matrix material of the bipolar plates. In an especially useful embodiment, the polymeric material included in the frame and end plates is substantially the same as the matrix material. Having the frame and end plates bondable to the bipolar plates and frame and end plates bondable to each other has substantial advantages. For example, the battery can be assembled using conventional and well known techniques, such as ultrasonic, vibrational or other means for thermal or adhesive welding. Further, such bonding effectively isolates each individual bipolar cell so that, for example, electrolyte can not flow from one cell to another.

In one particularly useful embodiment, the present spacer elements are produced as an integral part of the frame components and end plate. In another particularly useful embodiment, the bipolar plate and the frame having the spacer element as an integral part thereof, are each produced as a preform. For the preform bipolar plate, the polymer material and conductive substrate, e.g., fiber, are compression molded to the approximate and/or near net shape dimension of the bipolar plate in the finished frame/bipolar plate assembly. The frame/spacer element assembly is molded, preferably injection molded as half frame/spacer elements, to the approximate and/or near net shape of the frame/spacer element assembly in the finished frame/bipolar plate assembly. The two preforms are then combined to produce a final assembly preform which is compression molded into the final net dimension bipolar plate/frame/spacer element assembly. In a particularly useful embodiment, the final assembly preform is heated to a temperature wherein the assembly has both a degree of physical integrity and polymer flow characteristics, for example, in the range of about 450° F. to about 650° F. The assembly is then compression molded at a mold temperature, for example, in the range of about 175° F. to about 350° F. It has been found that excellent hermetic seals, flat structures and reduced or minimum void composites are obtained by this process.

Any suitable positive active electrode material or combination of such materials useful in lead-acid batteries may be employed in the present invention. The positive active electrode material is preferably lead dioxide. The positive active electrode material can be prepared by dispersing lead dioxide particles in water to form a paste. Alternately, a positive active electrode material precursor paste of lead sulfate and litharge (PbO) in water can be used, or conventional pastes, such as those produced from leady oxide, sulfuric acid and water, can be used. After the paste is applied to the first surface of the matrix material, it is dried and cured. The precursor paste may be converted to lead dioxide by applying a charging potential to the paste.

Any suitable negative active electrode material useful in lead-acid batteries may be employed in the present invention. One particularly useful formed negative active electrode material comprises lead, e.g., sponge lead. Conventional lead paste prepared from leady oxide, sulfuric acid, water and suitable expanders can be used.

Each of the bipolar cells of the present battery further includes a non-electrically conductive separator means acting to separate the positive and negative electrodes of the cell and to hold electrolyte. Any suitable material may be included in the separation means provided that it has no substantial detrimental effect on the functioning of the cell or battery. For example, the separator means may be similar to the separators previously used for sealed lead-acid batteries operating on the oxygen recombination principle, i.e., oxygen recombinant batteries. In particular, separators of one or more layers of silica-based glass, preferably separators formed of a highly absorptive porous mat of acid-wettable binder-free microfine glass fibers, may be used. Typically, a mix of fibers may be employed whose individual fibers have an average diameter in the range of about 0.2 to about 10 microns, more preferably about 0.4 to 5.0 microns, with possible minor amounts of larger gauge fibers to facilitate production of the mat. The porosity is preferably high, more preferably in the range of about 80% to about 98% and still more preferably about 85% to about 95%, if in the compressed state in the cell (slightly higher in the uncompressed state). The separator preferably has a relatively high surface area, more preferably in the range of about 0.1 to about 20 $m^2/g$, which facilitates the absorption and retention of relatively large amounts of acid electrolyte volumetrically while, if desired, still having a substantial unfilled pore volume permeable to oxygen for transport directly through the separator for consumption at the negative electrode. The particularly preferred separator materials have a surface area as measured by the BET method of in the range about 0.2 to about 3.0 $m^2/g.$, especially about 1.0 to about 2.0 $m^2/g$.

When the battery is structured to operate as a oxygen recombinant battery, the separator means are preferably compressible and are compressed against the major faces of the positive and negative electrodes so that the plates, electrodes and separators of the battery preferably are under firm mutual stacking pressure. In the usual manner for starved recombinant batteries, sulfuric acid liquid electrolyte is absorbed within the electrodes and separator material, e.g., in the pore structure thereof, in a starved amount (less than saturated), such that evolved gasses are able to readily diffuse through voids in the porous elements forming a low tortuosity path to be internally recombined at thin film sites, e.g., oxygen evolved at the positive electrode diffuses in the gas phase directly through voids in the separator and then diffuses through a thin layer of electrolyte (also defining voids) on the negative active material to be consumed. Preferably such thin layer is substantially homogeneously distributed throughout the negative (and positive) electrode, the extent of such thin layer determined by the degree of starvation of the electrode.

In the charged condition of the cell, the specific gravity of the electrolyte is preferably in the range of about 1.200 to about 1.400, more preferably about 1.300 to about 1.380.

Starved electrolyte gas recombinant batteries are sealed so that they can operate above atmospheric pressure. For batteries of this type to work well, the separator should be firmly in contact with the electrodes, which in turn should be firmly in contact with the bipolar plates. This contact is achieved by compressing the separators somewhat. Good separator contact hinders gas from bubbling to the top of the battery along the surface of the electrodes thus aiding in recombination. Good surface contact is also necessary in order to assure uniform wetting of the positive and negative active materials. The existence of dry areas could seriously impair battery performance. Close contact between the separator and the positive electrode serves to retain the positive active material. This design element serves to give the battery excellent vibration resistance. Too much compression will reduce the void volume of the separator, and too little can result in poor electrode contact. Preferably, the recombinant separator is under compression in the range of about 5% to about 40%, more preferably to about 15% to about 25%, and has about 5% to about 10% void space after electrolyte addition.

Certain of these and other aspects of the present invention are set forth in the following description, particularly when considered in conjunction with the accompanying drawings in which like parts bear like reference numerals.

BRIEF DESCRIPTION OF THE DRAWINGS

FIG. 7 is a front side view in perspective and partly cut away showing a portion of an alternate bipolar cell in accordance with the present invention.

FIG. 8 is a somewhat schematic front side view in perspective showing an alternate embodiment of a bipolar battery in accordance with the present invention being filled with electrolyte.

DETAILED DESCRIPTION OF THE DRAWINGS

Figure 1:
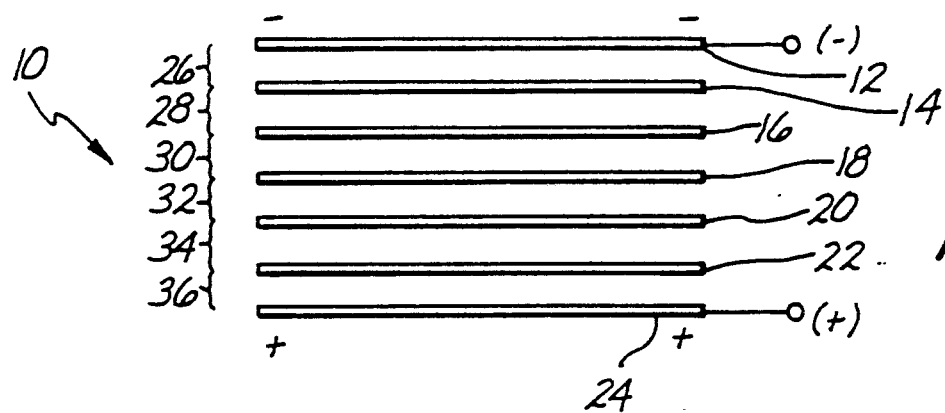
FIG. 1 is a schematic diagram of a bipolar battery in accordance with the present invention.

Referring now to FIG. 1, a schematic representation of a bipolar battery, depicted generally as 10, is shown. Battery 10 includes a negative current collector plate (a negative mono-plate) 12, first through fifth bipolar plates 14, 16, 18, 20 and 22, respectively, and a positive current collector plate (a positive mono-plate) 24. These plates, together with the positive and negative electrodes and the separators, as will be discussed hereinafter, provide for the first through sixth bipolar cells 26, 28, 30, 32, 34 and 36. The spacing between the plates of assembled battery 10 is maintained substantially uniform. Each of the bipolar cells develop a voltage potential of about two volts, so that battery 10 develops a total of about 12 volts. The negative current collector plate 12 is connected to a negative terminal, shown schematically as 38 in FIG. 2, while the positive current collector plate 24 is connected to a positive terminal, shown schematically as 40 in FIG. 2. The amount of current is determined by the weight of active material in the battery and its utilization efficiency.

Figure 2:
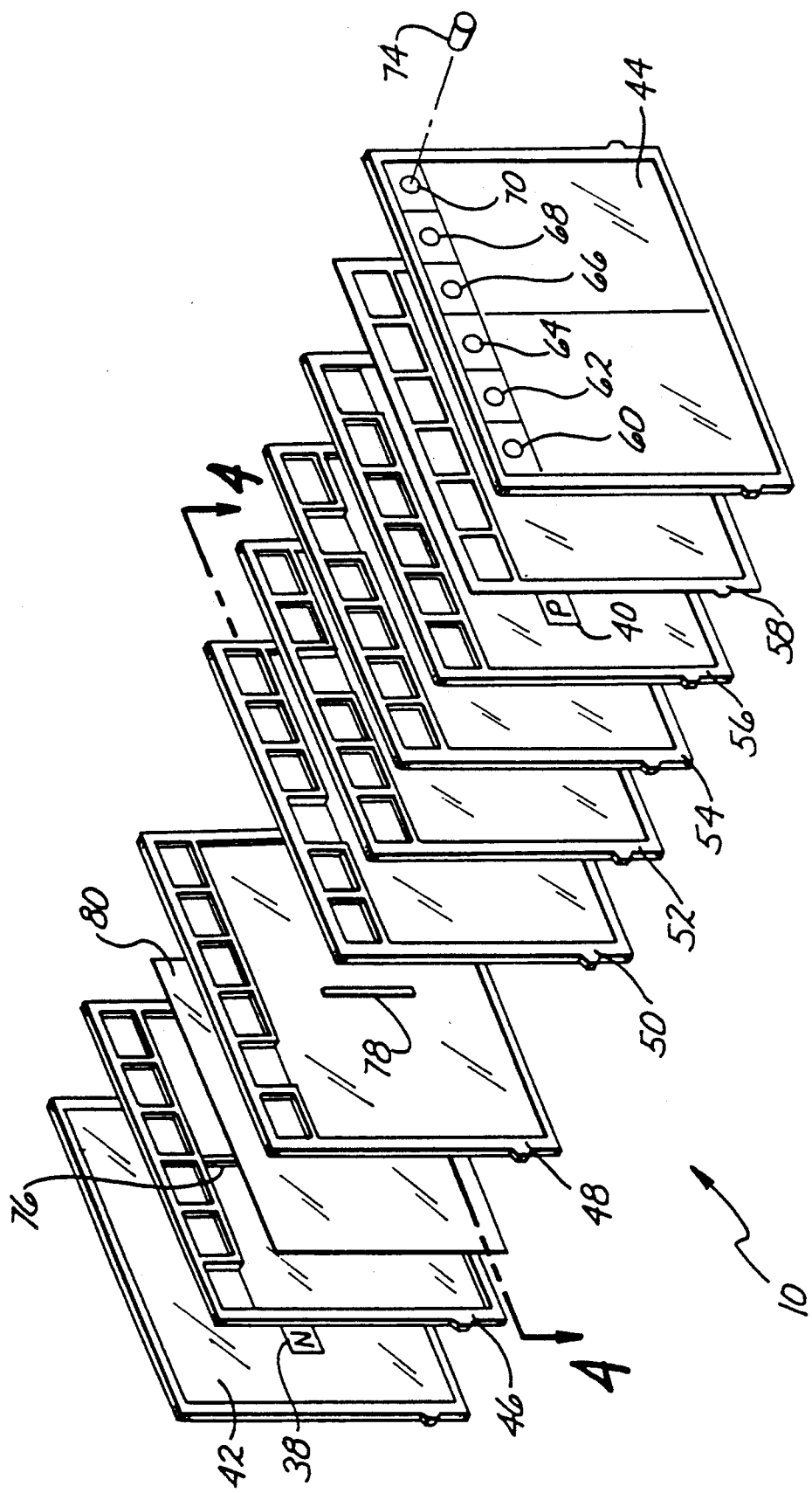
FIG. 2 is an exploded perspective view of the battery shown schematically in FIG. 1.

Referring now to FIG. 2, battery 10 includes a first end wall 42 and an opposing second end wall 44. A series of individually configured frame elements 46, 48, 50, 52, 54, 56 and 58 are provided and, in the assembled battery 10, are each bonded to a different one of the plates 12, 14, 16, 18, 20, 22 and 24, respectively, so that no electrolyte can flow across or around any of such plates.

Second end plate 44 includes a series of six (6) apertures 60, 62, 64, 66, 68 and 70. Each of the frame elements include six through holes each of which is isolated from the other through holes of the individualized frame element. When battery 10 is assembled, these through holes are aligned to form six (6) conduits. When the apertures are open, each of these conduits is in fluid communication with a different one of the open apertures.

Each of the frame elements is configured differently with respect to the through holes so that each of the bipolar cells is in fluid communication with a different one of the conduits. Thus, each of the frame elements 46, 48, 50, 52, 54 and 56 includes one through hole which is open to the bipolar cell associated with that individual frame element. As can be seen in FIG. 2, the open (or absent) through hole wall is positioned differently for each of the frame elements 46, 48, 50, 52, 54 and 56. None of the six (6) through holes in frame element 58 are open to any of the bipolar cells. The openings to the bipolar cells from the conduits are substantially perpendicular to the general direction of fluid flow in the conduits.

The individual combinations of aperture, conduit and bipolar cell opening can be effectively utilized to fill each individual bipolar cell with electrolyte, e.g., sulfuric acid. For example, after battery 10 is assembled, a vacuum is pulled on open aperture 60. This causes gases to evacuate first bipolar cell 26. Electrolyte is then passed into aperture 60, through the appropriate conduit in fluid communication with aperture 60 and into first bipolar cell 26. This evacuation/electrolyte addition cycle may be repeated two or three times to get the desired amount of electrolyte into the cell 26. The other bipolar cells are similarly filled with electrolyte, using different individual combinations of apertures, conduits and cell openings.

Figure 6:
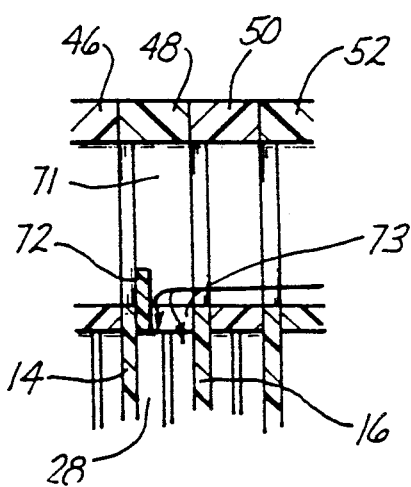
FIG. 6 is a partial cross-sectional view taken generally along line 6—6 of FIG. 5.

FIG. 6 illustrates one embodiment of the invention which facilitates rapid addition of electrolyte into the bipolar cells. As shown in FIG. 6, electrolyte is flowing into second bipolar cell 28. A flow director member 72 extends into the conduit 71 supplying electrolyte to be second bipolar cell 28. This flow director member 72, which extends across the entire bottom portion of the conduit, as shown in FIG. 6, causes the liquid electrolyte to fall through opening 73 into second bipolar cell 28 rather than flowing past the opening to second bipolar cell 28. This is particularly useful since such openings are often quite small. Each of the other conduits includes a similarly configured flow director member to facilitate electrolyte addition.

After the bipolar cells are filled with electrolyte to the desired degree, each of the apertures 60, 62, 64, 66, 68 and 70 can be closed to seal the battery 10. For example, a pressure relief valve 74 (only one shown in FIG. 2) may be placed in each of the apertures. Thus, each of the bipolar cells is individually protected against excessive pressure buildings. In addition, after battery 10 is sealed, each of the above-noted conduits provides additional "breathing" space for the individual bipolar cells. Thus, some gas buildup can occur, e.g., in the normal course of the battery operation, and be stored in this conduit without creating an emergency or causing the batteries performance to be adversely affected.

Figure 3:
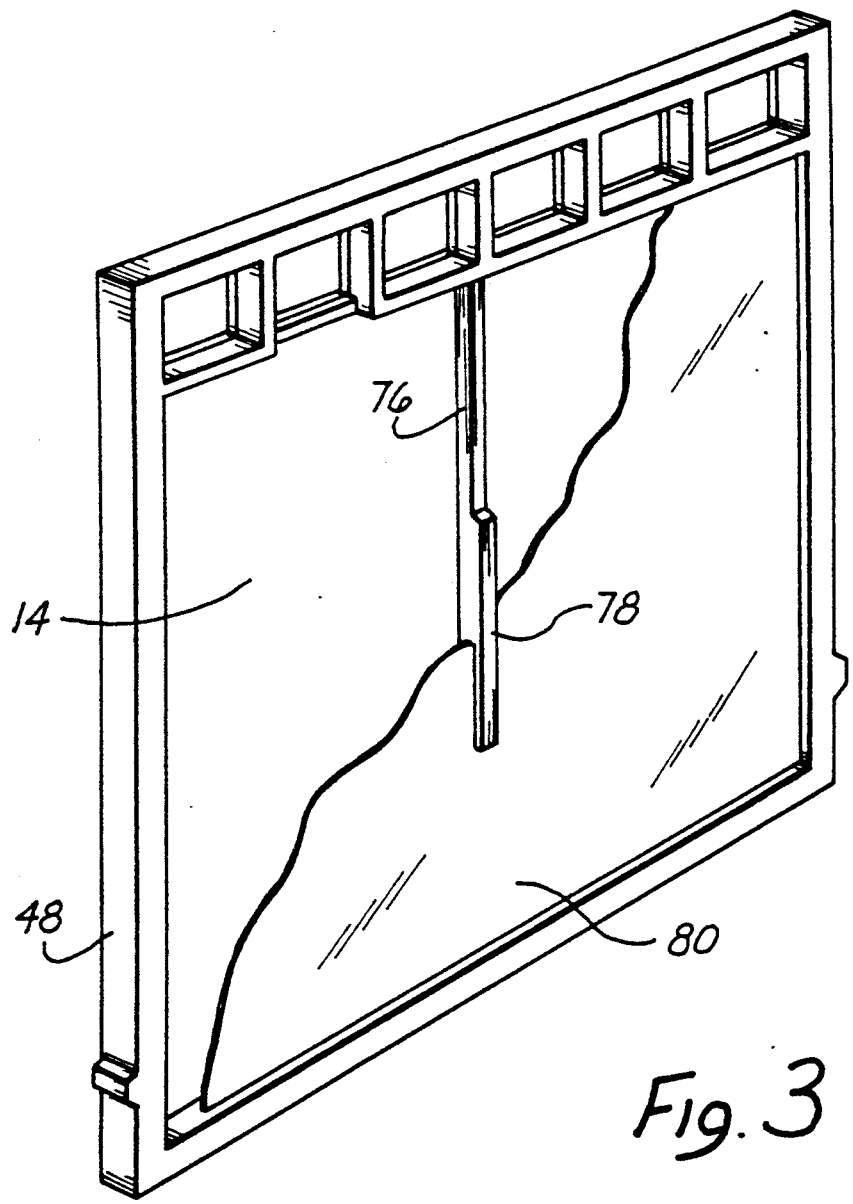
FIG. 3 is a front side view in perspective and partly cut away showing a portion of one of the bipolar cells of the battery shown schematically in FIG. 1.

FIG. 3 illustrates in more detail certain aspects of the frame elements and bipolar plates and cells of battery 10. In FIG. 3, second frame element 48 is shown. However, unless otherwise expressly set forth, the description with regard to FIG. 3 applies in a similar manner to frame elements 46, 50, 52, 54 and 56. Frame element 48 is preferably molded as a single piece. The first bipolar plate 14 is bonded to frame element 48, e.g., during assembly and molding of frame element 48. A spacer member 76 is provided and extends from the top of frame element 48 to the bottom and across the middle of frame element 48. Spacer member 76 may be mechanically or physically secured to frame element 48 and bipolar plate 14. However, it is preferred that spacer member 76 be molded as an integral part of frame element 48 and be bonded to bipolar plate 14 during final molding of frame element 48.

Spacer member 76 is non-electrically conductive and includes a central portion 78 which extends further outwardly from bipolar plate 14 than does the remainder of spacer member 76. This central portion 78 is sized and adapted to come in contact with, and preferably be bonded to, the adjacent bipolar plate 16. In the assembled battery 10, the spacer member 76 (together with the spacer members associated with the other plates) acts to maintain substantially uniform interplate and interelectrode spacing, which in turn provides substantial benefits, e.g., good electrical properties, to battery 10. Spacer member 76 is configured so that electrolyte, e.g., from one of the conduits, can flow to substantially all parts of bipolar cell without being unduly restricted by the spacer member 76.

The central portion 78 extends through the separator 80 which is associated with bipolar plate 14.

FIG. 7 illustrates an alternate embodiment of a means to provide for substantially uniform interplate and interelectrode spacing. Except as expressly described to the contrary, the components of this embodiment are the same as the embodiment shown in FIG. 3, with similar components being given the same reference numeral and the suffix "a". In this embodiment, frame element 48a is bonded to bipolar plate 14a. A series of five (5) spacer elements 82, 84, 86, 88 and 90 are spaced equidistantly along the length of frame element 48a. Each of these spacer elements is configured similarly to spacer member 76 and includes a central portion 92, 94, 96, 98 and 100, respectively, which extends through separator 80a. Each of these central portions are sized and adapted to contact the adjacent plate to maintain substantially uniform interplate and interelectrode spacing. The embodiment in FIG. 7 is used when the size of the plate is sufficiently large to warrant the use of more than one interplate/interelectrode spacer. Care should be taken to avoid an excessive number of such spacers since such spacers may adversely impact the amount of active electrode material that can be employed.

Figure 4:
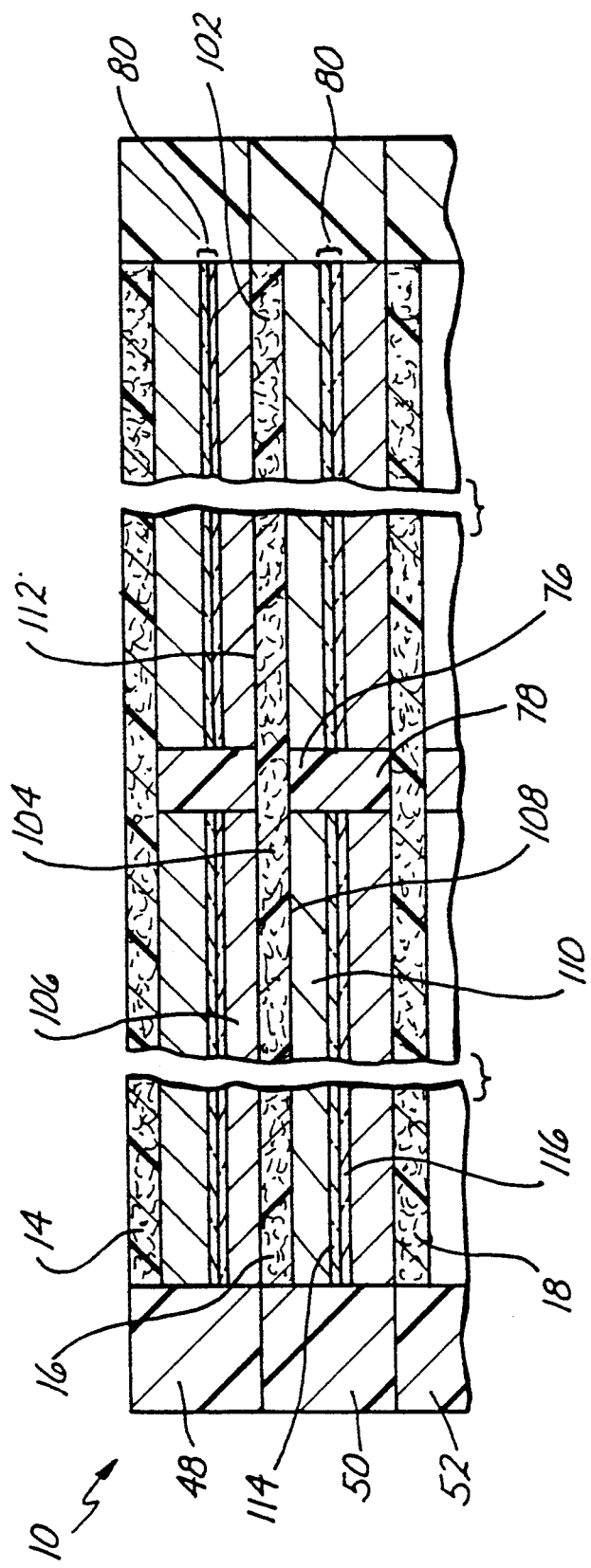
FIG. 4 is a cross-sectional view, taken generally along line 4—4 of FIG. 2 and showing in detail one of the bipolar cells of the battery shown schematically in FIG. 1 in its assembled form.

Referring now to FIG. 4, the frame element 50 and associated components are shown in detail as included in assembled battery 10. Bipolar plate 16 is bonded to frame element 50, while bipolar plate 14 is bonded to frame element 48 and bipolar plate 18 is bonded to frame element 52. Each of the bipolar plates of battery 10 is substantially similar in construction to bipolar plate 16. Therefore, only the construction of bipolar plate 16 is discussed in detail, it being understood that such discussion applies to the other bipolar plates.

Bipolar plate 16 includes a body 102 of non-woven fiberglass mat with the glass being C-glass (with a composition substantially as indicated previously), the strands of which contain a coating of electrically conductive fluoride ion doped tin oxide. Body 102 has a porosity of about 75%. The average diameter of the individual fibers or strands in body 102 is in the range of about 19 to about 35 microns. The average thickness of the doped tin oxide coating is about 0.7 micron and about 2 mole % of the coating is fluoride ion.

The fiberglass body 102 is embedded in a layer 104 of polycarbonate thermoplastic, preferably derived from cyclic bisphenol A oligomers. Such oligomers are particularly useful since they have relatively low viscosity and effectively wet the body 102 so that the bipolar plate 16 is formed with substantially no void space.

A positive active electrode material 110 is located in contact with the first surface 112 of bipolar plate 16. A negative active electrode material 106 is located in contact with the second surface 108 of bipolar plate 16. The opposite polarity electrodes are formed by supplying the appropriate paste in the normal manner onto both first and second surfaces of bipolar plate 16. The electrodes of the batteries of this invention preferably have a thickness in the range of about 0.007 to about 0.060 inches, more preferably about 0.010 to about 0.040 inches, and still more preferably about .015 to about 0.025 inches. The unformed paste material for the positive electrode may suitably be a high density material of substantially 70% by weight (PbO), together with any added components such as bulking agents or binders. To these components is added sufficient water to obtain a paste having in the preferred embodiment a density of approximately 3.6 to about 4.8 grams of paste per cubic centimeter of mixture. Sulfated, lower density pastes may also be used with advantage, as dictated by the desired properties of the battery. Similarly, the unformed negative paste material may be formed of a high density material composed, for instance, of 100% PbO in addition to the normal expander and binder together with water to yield a paste density of about 4.0 to about 4.8 grams per cubic centimeter. For high rate performance, a sulfated paste of relatively lower density is formed preferably of lead oxide (litharge plus about 15-25 percent free lead particles) together with expander and an aqueous solution of sulfuric acid.

Two layers 114 and 116 of highly absorptive porous mat of acid wettable binder free microfine glass fibers, as described in detail previously, make up each separator 80, which separate the positive and negative electrodes and hold electrolyte.

The central portion 78 of the spacer member 76, which itself is bonded to bipolar plate 16, extends through separator 80 and is bonded to adjacent bipolar plate 18. Spacer member 76 is non-electrically conductive so that no current flows from bipolar plate 16 to bipolar plate 18.

When battery 10 is structured to operate as a flooded battery, the bipolar plates, electrodes and separators should be in contact. When battery 10 is structured to operate as a sealed oxygen recombinant battery, the bipolar plates, electrodes and separators should be in compressive contact, e.g., so that the separators are under compression, as discussed previously.

Negative current collector plate 12 is structured similarly to the bipolar plates except that the plate itself is not electrically conductive and does not have a positive electrode directly associated with it. Conversely, positive current collector plate 58 is structured similarly to the bipolar plates except that the plate itself is not electrically conductive and does not have a negative electrode directly associated with it. The end plates 42 and 44 are non-electrically conductive.

Preferably, all of the plates, spacer members, and frame elements are made of thermoplastic polymers which are bondable together using conventional thermoplastic polymer processing techniques. In a particularly preferred embodiment, each of these components is made of the same bondable thermoplastic material, in particular aromatic polycarbonate and especially polycarbonate derived from cyclic oligomers of bisphenol A.

Each of the bipolar plates preferably have a thickness in the range of about 0.015 inches to about 0.04 inches.

Such bipolar plates, together with the electrodes and separator layers can be prepared ready for assembly into the battery 10. Through the use of injection molding or compression molding, each of the frame elements, together with the associated spacer member can be formed. The various components are then assembled into a battery, e.g., using conventional thermoplastic polymer assembly techniques. A particularly useful assembly process utilizes either ultrasonic or vibrational welding since such techniques produce a hermetic seal between the bipolar cells. For example, final frame elements containing space members and plates are welded together to form assembled bipolar battery 10. The final assembly is also rugged, which feature is very important in applications where the battery is to see high vibrational environments, such as in electric vehicles. Such ultrasonic and vibrational plastic welding assembly processes are conventional and well known in the art.

Figure 5:
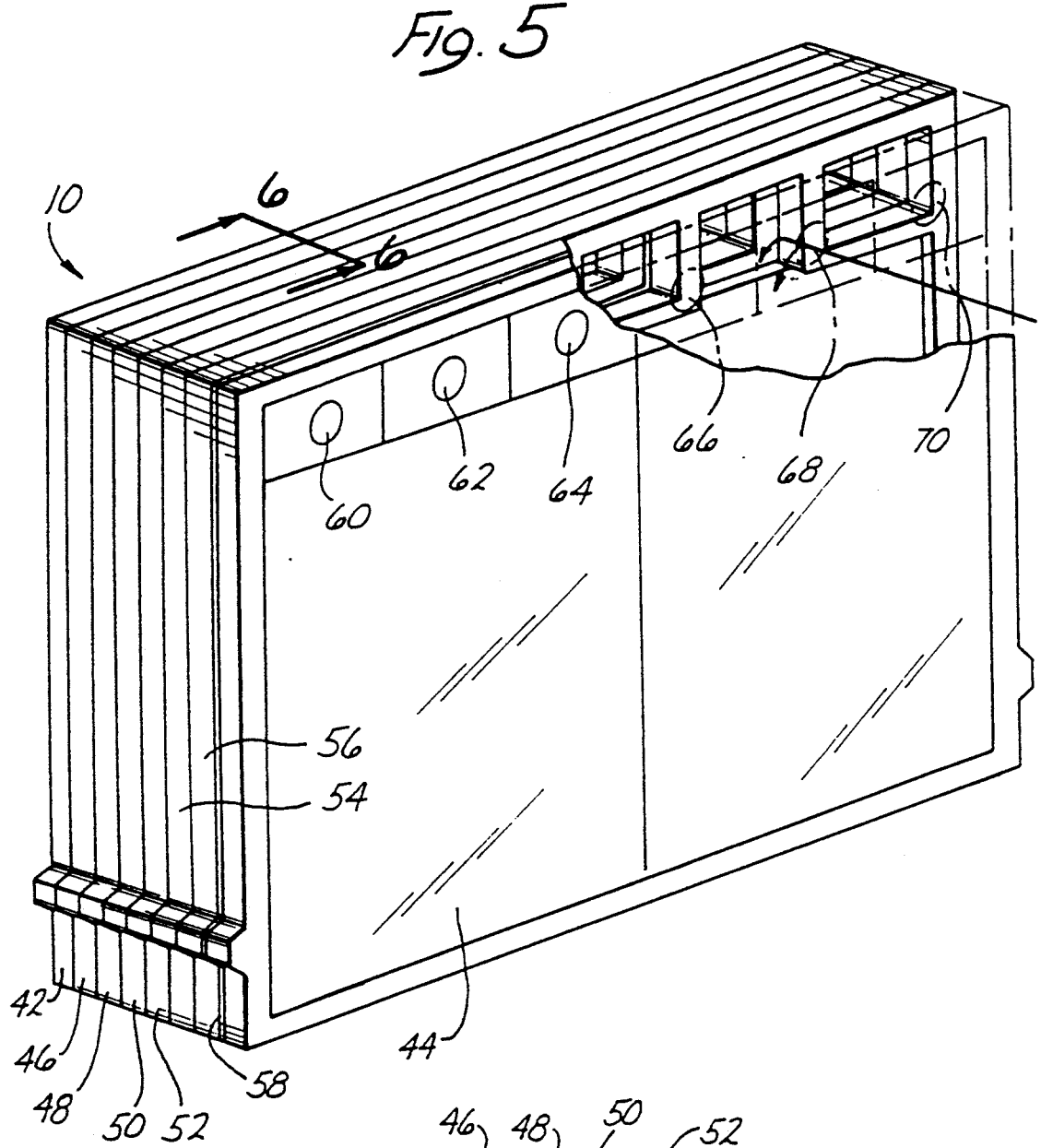
FIG. 5 is a front side view in perspective and partially cut away showing the assembled battery shown schematically in FIG. 1 being filled with electrolyte.

FIG. 5 shows the assembled battery 10 in which one of the bipolar cells is being filled with electrolyte. Typical outer dimensions of the battery can vary in the range of about 2 inches to about 18 inches in the length and height directions, the footprint or geometry, e.g., square, rectangular, circular or other, being a function of the final product application, for example, from portable batteries to electric vehicle batteries. Typical depth dimensions are in the range of about 0.75 to about 2 inches, for example, in the range of about 1 inch to about 1.5 inches, for a 12 volt battery. Typical inner dimensions for each of the electrodes in each cell are in the range of about 0.01 to about 0.055 inches, preferably in the range of about 0.015 to about 0.045 inches. Separator thickness in each cell varies according to the type of battery and the electrolyte requirements to satisfy the capacity of the battery. Typical separator thicknesses are in the range of about 0.03 inches to about 0.175 inches for each cell.

FIG. 8 illustrates another embodiment in which two parallel or independent batteries are provided in a single assembly. This assembly, shown generally as 210, includes a first bipolar battery 212 and a second bipolar battery 214. First bipolar battery 212 is structured similarly to the assembled battery 10, except that the end plate 216, corresponding to end plate 42 of battery 10, includes six (6) open apertures each in fluid communication with a different one of the aperture 260, 262, 264, 266, 268 and 270 in end plate 244. Second bipolar battery 214 is structured similarly to the battery 10, except that end plate 216 is shared with first bipolar battery 212.

Each of the apertures 260, 262, 264, 266, 268 and 270 can be used to fill two bipolar cells, one in first bipolar battery 212 and one in second bipolar battery 214, with electrolyte. Many of the advantages provided by battery 10 are also provided by first bipolar battery 212 and second bipolar battery 214. In addition, assembly 210 allows one to produce two independent batteries in one assembly. Thus, assembly 210 is quite flexible and versatile.

Battery 10 and assembly 210 are configured as sealed oxygen recombinant batteries and are placed in service and perform well in both the charge and discharge modes. The doped tin oxide coating on the bodies 102 provides adequate conductivity. Importantly, this performance continues after a period of time in charge/discharge cyclic operation. This performance stability is vital in many lead-acid battery applications.

While this invention has been described with respect to various specific examples and embodiments, it is to be understood that the invention is not limited thereto and that it can be variously practiced within the scope of the following claims.

What is claimed is:

1. In an assembled battery including a plurality of bipolar cells, the improvement which comprises a plurality of conduit means for introducing electrolyte into said bipolar cells, each of said conduit means positioned to be in fluid communication with a different single bipolar cell of said plurality of bipolar cells and to cross over at least one other bipolar cell adjacent said single bipolar cell and acting to introduce electrolyte into said single bipolar cell.

2. The assembled battery of claim 1 which is structured to operate as a flooded battery.

3. The assembled battery of claim 1 which is structured to operate as an oxygen recombinant battery.

4. The assembled battery of claim 1 which further comprises an end plate having a plurality of apertures each of which being a portion of a different one of said conduits.

5. The assembled battery of claim 4 wherein each of said apertures is associated with a venting means after electrolyte addition.

6. The assembled battery of claim 4 which further comprises a second plurality of bipolar cells; and an intermediate plate separating said plurality of bipolar cells from said second plurality of bipolar cells, and including a plurality of apertures each of which is in fluid communication with one of said bipolar cells in each of said plurality of bipolar cells and said second plurality of bipolar cells.

7. The assembled battery of claim 1 wherein each of said bipolar cells has a periphery and includes a fluid impervious spacer element located at least partially away from the periphery of said bipolar cell and acting to maintain the spacing between said bipolar cell and an adjacent bipolar cell.

8. The assembled battery of claim 1 which further comprises direction means associated with at least one of said conduit means and acting to direct the flow of electrolyte into the one of said bipolar cells in fluid communication with said one conduit means.

9. In an assembled battery including a plurality of bipolar cells each of which includes a first fluid impervious conductive matrix having a periphery and mutually opposing first and second surfaces; positive active electrode material in contact with said first surface of said first matrix; negative active electrode material spaced apart from said positive active electrode material; non-electrically conductive separator means acting to separate said positive active electrode material from said negative active electrode material and to hold electrolyte; and a second fluid impervious conductive matrix having a periphery and mutually opposing first and second surfaces, said negative active electrode material being in contact with said second surface of said second matrix, the improvement comprising at least one fluid impervious spacer element located at least partially away from the peripheries of said first matrix and said second matrix, and being in contact with said first matrix and said second matrix.

10. The assembled battery of claim 9 which comprises a plurality of said spacer elements.

11. The assembled battery of claim 9 wherein said spacer element acts to maintain the spacing between said first matrix and said second matrix.

12. The assembled battery of claim 9 wherein said spacer element is structured so as to provide for substantially no electrical conduction between said first matrix and said second matrix.

13. The assembled battery of claim 9 wherein said spacer element is secured to said first matrix and said second matrix.

14. The assembled battery of claim 9 wherein said first matrix and said second matrix each includes a thermoplastic polymeric material.

15. The assembled battery element of 9 wherein said first matrix and said second matrix each is part of a bipolar plate which further comprises an acid resistant substrate at least partially coated with an electrically conductive coating, said substrate being at least partially embedded in said matrix.

16. The assembled battery element of claim 15 wherein said acid resistant substrate is glass and said coating is doped tin oxide.

17. The assembled battery element of claim 15 wherein said acid resistant glass substrate is glass and said coating is fluorine doped tin oxide.

18. The assembled battery of claim 9 which is structured to operate as a flooded battery.

19. The assembled battery of claim 9 which is structured to operate as an oxygen recombinant battery.

20. In an assembled battery including a plurality of bipolar cells, the improvement which comprises a means acting to substantially isolate said bipolar cells so that fluid components from one of said bipolar cells are effectively limited from interfering with the functioning of another of said bipolar cells and further acting to provide a conduit through which electrolyte is introduced into said one bipolar cell.

21. The assembled battery of claim 20 wherein said means includes a plurality of individual compartments, each of said compartments being located in fluid communication with and spaced apart from a different one of said bipolar cells.

22. The assembled battery of claim 20 which is structured to operate as a flooded battery.

23. The assembled battery of claim 20 which is structured to operate as an oxygen recombinant battery.

24. The assembled battery of claim 20 wherein said fluid components from one of said bipolar cells are substantially prevented from interfering with the functioning of another of said bipolar cells.

25. In an assembled battery including a plurality of bipolar cells, the improvement which comprises a plurality of means for introducing electrolyte into said bipolar cells, each of said means acting to introduce electrolyte into a different one of said bipolar cells and including a conduit which is in fluid communication with the one of said bipolar cells into which said means acts to introduce electrolyte; and an end plate having a plurality of apertures each of which being a portion of a different one of said conduits.

26. The assembled battery of claim 25 wherein each of said apertures is associated with a venting means after electrolyte addition.

27. The assembled battery of claim 25 which further comprises a second plurality of bipolar plates; and an intermediate plate separating said plurality of bipolar cells from said second plurality of bipolar cells, and including a plurality of second apertures each of which is in fluid communication with one of said bipolar cells in each of said plurality of bipolar cells and said second plurality of bipolar cells first and second groups.

28. The assembled battery of claim 25 which further comprises direction means associated with at least one of said conduits and acting to direct the flow of electrolyte into the one of said bipolar cells in fluid communication with said conduit.

29. In an assembled battery including a plurality of bipolar cells, the improvement which comprises a plurality of means for introducing electrolyte into said bipolar cells, each of said means acting to introduce electrolyte into a different one of said bipolar cells, provided that each of said bipolar cells has a periphery and includes a fluid impervious spacer element located at least partially away from the periphery of said bipolar cell and acting to maintain the spacing between said bipolar cell and an adjacent bipolar cell.

* * * * *

UNITED STATES PATENT AND TRADEMARK OFFICE
CERTIFICATE OF CORRECTION

PATENT NO. : 5,068,160

DATED : November 26, 1991

INVENTOR(S) : Clough et al

It is certified that error appears in the above-identified patent and that said Letters Patent is hereby corrected as shown below:

Column 7, line 24; delete "considertions" and insert in place thereof --considerations--

Column 16, line 2; delete "112" and insert in place thereof --108--

Column 16, line 4; delete "108" and insert in place thereof --112--

Signed and Sealed this

Twentieth Day of April, 1993

Attest:

MICHAEL K. KIRK

*Attesting Officer*    Acting Commissioner of Patents and Trademarks